(12) United States Patent
Orsino et al.

(10) Patent No.: US 12,250,623 B2
(45) Date of Patent: Mar. 11, 2025

(54) ON DEMAND SYSTEM INFORMATION BLOCK REQUEST OVER SRB3

(71) Applicant: Telefonaktiebolaget LM Ericsson (PUBL), Stockholm (SE)

(72) Inventors: Antonino Orsino, Kirkkonummi (FI); Ritesh Shreevastav, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 355 days.

(21) Appl. No.: 17/775,056

(22) PCT Filed: Nov. 6, 2020

(86) PCT No.: PCT/IB2020/060461
§ 371 (c)(1),
(2) Date: May 6, 2022

(87) PCT Pub. No.: WO2021/090259
PCT Pub. Date: May 14, 2021

(65) Prior Publication Data
US 2022/0394602 A1    Dec. 8, 2022

Related U.S. Application Data

(60) Provisional application No. 62/932,069, filed on Nov. 7, 2019.

(51) Int. Cl.
*H04W 48/16* (2009.01)
(52) U.S. Cl.
CPC ................................ *H04W 48/16* (2013.01)

(58) Field of Classification Search
CPC ..... H04W 48/16; H04W 48/00; H04W 48/02; H04W 48/04; H04W 48/06; H04W 48/08; H04W 48/10; H04W 48/12; H04W 48/14
See application file for complete search history.

(56) References Cited

U.S. PATENT DOCUMENTS

| 2008/0225785 | A1* | 9/2008 | Wang | H04W 74/002 |
| | | | | 370/329 |
| 2019/0306784 | A1* | 10/2019 | Chen | H04W 48/14 |
| 2021/0377805 | A1* | 12/2021 | Liu | H04W 28/12 |

FOREIGN PATENT DOCUMENTS

| CN | 108464047 A | 8/2018 |
| EP | 4055894 A1 | 9/2022 |
| JP | 2011-238997 A2 | 11/2011 |
| WO | 2019 099463 A1 | 5/2019 |

(Continued)

OTHER PUBLICATIONS

Notice of Allowance issued for Japanese Patent Application No. 2022-526284—Jan. 19, 2024.

(Continued)

*Primary Examiner* — Mehmood B. Khan
(74) *Attorney, Agent, or Firm* — Baker Botts L.L.P.

(57) ABSTRACT

A method by a wireless device includes generating an on-demand request for at least one system information block (SIB). The wireless device, which is configured for both signaling radio bearer of type 1 (SRB1) and signaling radio bearer of type 3 (SRB3), determines to prioritize SRB1 over SRB3. The wireless device transmits, to a network node, the on-demand request for the at least one SIB on the SRB3 that is prioritized over the SRB1.

20 Claims, 15 Drawing Sheets

(56) References Cited

FOREIGN PATENT DOCUMENTS

WO     2019 139525 A1     7/2019
WO     2021090259 A1     5/2021

OTHER PUBLICATIONS

PCT Notification of Transmittal of the International Search Report and the Written Opinion of the International Searching Authority, or the Declaration issued for International application No. PCT/IB2020/060461—Feb. 12, 2021.
3GPP TSG-RAN WG2 Meeting #106; Reno, Nevada; Source: ZTE Corporation, Sanechips; Title: Discussion on solutions for MCG fasts recovery (R2-1907104)—May 13-17, 2019.
3GPP TSG-RAN WG2 #107bis; Chongqing, China; Change Request; Title: Running CR on on-demand SI procedure in RRC_Connected (R2-1913945)—Oct. 14-18, 2019.
3GPP TSG-RAN WG2 #108; Reno, Nevada; Source: Ericsson; Title: Sending on-demand SIB(s) request over SRB3 (R2-1915373)—Nov. 18-22, 2019.
3GPP TSG-RAN WG2 #107bis; Chongqing, China, Oct. 14-18, 2019; Agenda item: 6.10.5 Fast MCG link Recovery; Source: NEC; Title: Configuration of fast MCG recovery (R2-1912984).
3GPP TSG-RAN WG2 Meeting #107bis; Chongqing, China; 14th-18th 2019; Agenda item: 6.10.5; Source: Samsung; Title: Discussion on MCG Fast Recovery (R2-1912490).
Notification of Reasons for Refusal issued for Japanese Application No. 2022-526284—Jun. 23, 2023.
Office Action issued for Chinese Application Serial No. 202080084880.9—Nov. 1, 2023.

\* cited by examiner

ON DEMAND SYSTEM INFORMATION BLOCK REQUEST OVER SRB3

PRIORITY

This nonprovisional application is a U.S. National Stage Filing under 35 U.S.C. § 371 of International Patent Application Serial No. PCT/IB2020/060461 filed Nov. 6, 2020 and entitled "ON DEMAND SYSTEM INFORMATION BLOCK REQUEST OVER SRB3" which claims priority to U.S. Provisional Patent Application No. 62/932,069 filed Nov. 7, 2019 both of which are hereby incorporated by reference in their entirety.

TECHNICAL FIELD

The present disclosure relates, in general, to wireless communications and, more particularly, systems and methods for on demand System Information Block(s) (SIB(s)) request over SRB3.

BACKGROUND

In RAN2, it was agreed (i.e., in RAN2 #107) that the User Equipment (UE) in RRC_CONNECTED is allowed to request system information on-demand to the network. The granularity of the request is done per System Information Block (SIB) but is still open whether also a granularity for System Information (SI) is also allowed. Further, it was agreed that the UE should send the on-demand SIB(s) request via the SRB1 and the network responds to the request with an RRCReconfiguration including the requested SIB(s) or only some of them.

In $3^{rd}$ Generation Partnership Project (3GPP), the dual-connectivity (DC) solution has been specified, both for Long Term Evolution (LTE) and between LTE and New Radio (NR). In Dual Connectivity (DC), two nodes are involved, a master node (MN) and a Secondary Node (SN). The MN may include a master eNodeB (MeNB), and the SN may include a secondary eNB (SeNB). Multi-connectivity (MC) is the case when there are more than two nodes involved. Also, it has been proposed in 3GPP that DC is used in the Ultra Reliable Low Latency Communications (URLLC) cases in order to enhance the robustness and to avoid connection interruptions.

There are different ways to deploy $5^{th}$ Generation (5G) network with or without interworking with LTE (also referred to as Evolved Universal Terrestrial Radio Access (E-UTRA)) and evolved packet core (EPC). FIG. 1 illustrates LTE and NR interworking options.

In principle, NR and LTE can be deployed without any interworking, denoted by NR stand-alone (SA) operation. That is, the gNodeB (gNB) in NR can be connected to 5G core network (5GC) and the eNodeB (eNB) can be connected to EPC with no interconnection between the two (Option 1 and Option 2 in FIG. 1). On the other hand, the first supported version of NR is the so-called E-Universal Terrestrial Radio Access Network (E-UTRAN)-NR Dual Connectivity (EN-DC), illustrated by Option 3 in FIG. 1. In such a deployment, dual connectivity between NR and LTE is applied with LTE as the master and NR as the secondary node. The RAN node (i.e., gNB) supporting NR, may not have a control plane connection to core network (EPC), instead it relies on the LTE as MeNB. This is also called as "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, option 2 supports stand-alone NR deployment where gNB is connected to 5GC. Similarly, LTE can also be connected to 5GC using option 5 (also known as eLTE, E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that, Option 4 and option 7 are other variants of dual connectivity between LTE and NR which will be standardized as part of NG-RAN connected to 5GC, denoted by Multi-Radio Dual Connectivity (MR-DC). Under the MR-DC umbrella, there are the following options:

E-UTRAN-NR Dual Connectivity (EN-DC) (Option 3): LTE is the master node and NR is the secondary (EPC Core Network (CN) employed)

NR-E-UTRA Dual Connectivity (NE-DC) (Option 4): NR is the master node and LTE is the secondary (SGCN employed)

Next Generation Dual Connectivity (NGEN-DC) (Option 7): LTE is the master node and NR is the secondary (SGCN employed)

New Radio Dual Connectivity (NR-DC) (variant of Option 2): Dual connectivity where both the master and secondary are NR (SGCN employed).

As migration for these options may differ from different operators, it is possible to have deployments with multiple options in parallel in the same network. For example, there could be eNB base station supporting option 3, 5 and 7 in the same network as NR base station supporting 2 and 4. In combination with dual connectivity solutions between LTE and NR, it is also possible to support Carrier Aggregation (CA) in each cell group (i.e. Master Cell Group (MCG) and Secondary Cell Group (SCG)) and DC between nodes on same Radio Access Technology (RAT) (e.g. NR-NR DC). For the LTE cells, a consequence of these different deployments is the co-existence of LTE cells associated to eNBs connected to EPC, 5GC or both EPC/5GC.

As said earlier, DC is standardized for both LTE and E-UTRA-NR DC (EN-DC).

LTE DC and EN-DC are designed differently when it comes to which nodes control what. Basically, there are two options:

1. Centralized solution (like LTE-DC),
2. Decentralized solution (like EN-DC).

FIG. 2 illustrates the schematic control plane architecture for LTE DC and EN-DC. The main difference here is that, in EN-DC, the SN has a separate Radio Resource Control (RRC) entity (NR RRC). This means that the SN can also control the UE, sometimes without the knowledge of the MN but often the SN need to coordinate with the MN. In LTE-DC, the RRC decisions always come from the MN (MN to UE). Note however, the SN still decides the configuration of the SN since it is only the SN itself that has knowledge of what kind of resources, capabilities it has.

For EN-DC, the major changes compared to LTE DC are:
The introduction of split bearer from the SN (known as SCG split bearer)
The introduction of split bearer for RRC
The introduction of a direct RRC from the SN (also referred to as SCG SRB)

FIGS. 3 and 4 show the User Plane (UP) and Control Plane (CP) architectures for EN-DC. Specifically, FIG. 3 illustrates network side protocol termination options for MCG, SCG and split bearers in MR-DC with EPC (EN-DC). FIG. 4 illustrates a network architecture for control plane in EN-DC.

The SN is sometimes referred to as SgNB (where gNB is an NR base station), and the MN as MeNB in case the LTE is the master node and NR is the secondary node. In the other case where NR is the master and LTE is the secondary node, the corresponding terms are SeNB and MgNB.

Split RRC messages are mainly used for creating diversity, and the sender can decide to either choose one of the links for scheduling the RRC messages, or it can duplicate the message over both links. In the downlink, the path switching between the MCG or SCG legs or duplication on both is left to network implementation. On the other hand, for the uplink (UL), the network configures the UE to use the MCG, SCG or both legs. The terms "leg", "path" and "RLC bearer" are used interchangeably throughout this document.

Inter-node RRC messages are RRC messages that are sent either across the X2-, Xn- or the NG-interface, either to or from the gNB, i.e. a single 'logical channel' is used for all RRC messages transferred across network nodes. The information could originate from or be destined for another RAT.

The CG-Config message is used to transfer the SCG radio configuration as generated by the SgNB or SeNB. The CG-Config message is discussed in more detail in TS 38.331 V 15.6.0.

CG-ConfigInfo

The CG-ConfigInfo message is used by master eNB or gNB to request the SgNB or SeNB to perform certain actions e.g. to establish, modify or release an SCG. The message may include additional information e.g. to assist the SgNB or SeNB to set the SCG configuration. It can also be used by a CU to request a DU to perform certain actions, e.g. to establish, modify or release an MCG or SCG. The CG-Config info message is discussed in more detail in TS 38.331 V 15.6.0.

On Demand System Information

On demand System information request is a feature in NR that allows the network to only broadcast some of the system information messages when there is a UE that needs to acquire it. The. UE then requests such System Information messages using either msg1 or msg3 based procedures. The procedure allows a UE to request the needed content on demand and it allows the network to minimize the overhead in constantly broadcasting information that no UE is currently acquiring.

Further, some of the System Information messages can be provided to the UE also in dedicated state using the RRC Connection Reconfiguration message.

For the RRC On demand SI framework the parameter si-BroadcastStatus is used to indicate if an SI message is currently being broadcasted or not.

si-BroadcastStatus ENUMERATED {broadcasting, notBroadcasting}

From UE perspective, independent of whether an SI message is indicated as broadcasting or notBroadcasting, the UE obtains the SI scheduling information for the SI message from SIB1. If the SI message is indicated as broadcasting, the UE can then directly acquire the SI message based on the SI scheduling information. However, if the SI message is indicated as notBroadcasting, the UE first needs to perform the on-demand SI request procedure to the base station in order to initiate the transmission of the SI message (according to the SI scheduling information).

Currently, the on-demand broadcast is based upon below msg1 and msg3 solutions:

Broadcast (Msg1 option):
   Msg1 SI Request Random Access Channel (RACH) procedure (PRACH, "RAW")
   Broadcast SI message (for some time)
Broadcast (Msg3 option):
   Msg3 SI Request RACH procedure (PRACH, RAR, RRCSystemInfoRequest, "Msg4")
   Broadcast SI message (for some time)

Further in 3gpp, the below unicast (dedicated signaling) from idle/inactive is also currently being discussed.

Unicast (from IDLE/INACTIVE):
   Full RACH procedure (PRACH, RAR, RRC Setup/Resume Request, RRC Setup/Resume)
   On demand request message
   Dedicated SI message In case of dedicated signaling, the network can make use of the mechanisms that are available in the CONNECTED, e.g. Hybrid Automatic Repeat Request (HARQ), beam forming etc., which will make the signaling a lot more efficient.

Certain problems exist. For example, according to the current agreement regarding the on-demand SIB(s) request for RRC_CONNECTED, it is unclear whether the UE can send the request via the SRB3.

SUMMARY

Certain aspects of the present disclosure and their embodiments may provide solutions to these or other challenges. For example, according to certain embodiments, a method is provided to address the case where the UE needs to request SIB(s), in an on-demand way, that is not scheduled in SIB1 such as, for example, those SIBs whose broadcast status is set to notBroadcasting or NW has decided to only deliver using dedicated delivery or for the case when UE does not have common bandwidth part configured.

According to certain embodiments, a method by a wireless device includes generating an on-demand request for at least one SIB. The wireless device, which is configured for both signaling radio bearer of type 1 (SRB1) and signaling radio bearer of type 3 (SRB3), determines to prioritize SRB1 over SRB3. The wireless device transmits, to a network node, the on-demand request for the at least one SIB on the SRB3 that is prioritized over the SRB1.

According to certain embodiments, a wireless device includes processing circuitry configured to generate an on-demand request for at least one SIB. The wireless device, which is configured for both SRB1 and SRB3, determines to prioritize SRB1 over SRB3. The wireless device transmits, to a network node, the on-demand request for the at least one SIB on the SRB3 that is prioritized over the SRB1.

According to certain embodiments, a method by a network node includes configuring a wireless device, which is configured for both SRB1 and SRB3, to prioritize SRB3 over SRB1. The network node receives, from the wireless device and on the SRB3, an on-demand request for at least one SIB.

According to certain embodiments, a network node includes processing circuitry configured to configure a wireless device, which is configured for both SRB1 and SRB3, to prioritize SRB3 over SRB1. The processing circuitry is further configured to receive, from the wireless device and on the SRB3, an on-demand request for at least one SIB.

Certain embodiments may enhance the current On demand SI solution and provide one or more of the following technical advantages. For example, a technical advantage may be that certain embodiments may provide opportunity to the UE to send the on-demand SIB(s) request via SRB3. As another example, a technical advantage may be that certain embodiments may provide opportunity to the UE to have a fallback solution in case the SRB1 is congested or not available. As still another example, a technical advantage may be that certain embodiments may provide more reliability and lower latency to the UE for requesting the SIB(s) on demand. As still another example, a technical advantage may be that a UE in dual-connectivity can use the on-demand request. As yet another example, a technical advantage may be that certain embodiments provide continuation of on demand functionality upon cell change Since the SRB3 has been specified for latencies purposes, one technical advantage may be that certain embodiments may allow the UE to send the on-demand SIB request over SRB3 may help to get timely information. This is particular good in those situations such as, for example, for positioning purpose, where assistance data from the network are fundamental.

Another technical advantage of certain embodiments may be that allowing the UE to send the on-demand SIB(s) request via SRB3 can be seen as a fallback solution in case the SRB1 is congested thus translate in considerable delay for receiving the requested SIB(s).

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
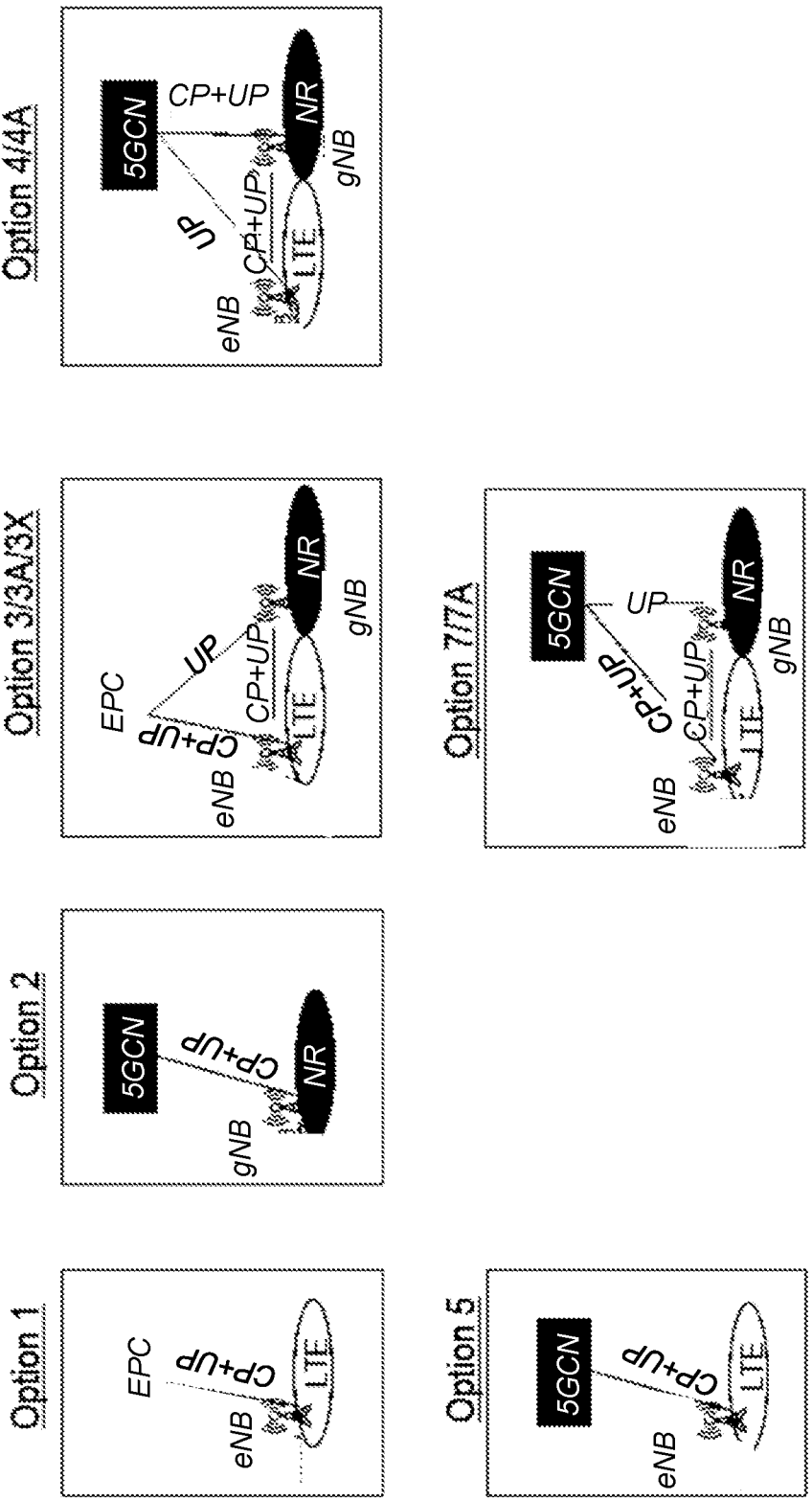
FIG. 1 illustrates LTE and NR interworking options.
Figure 2:
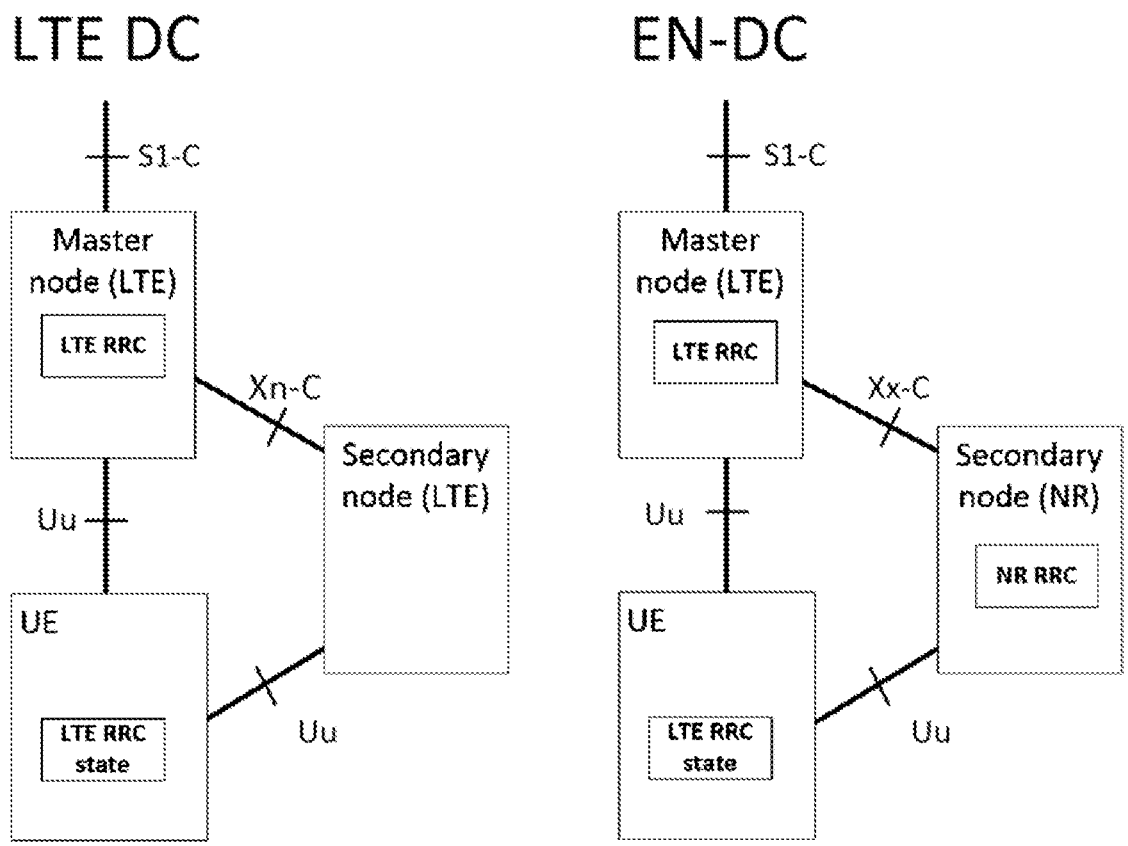
FIG. 2 illustrates the schematic control plane architecture for LTE DC and EN-DC.
Figure 3:
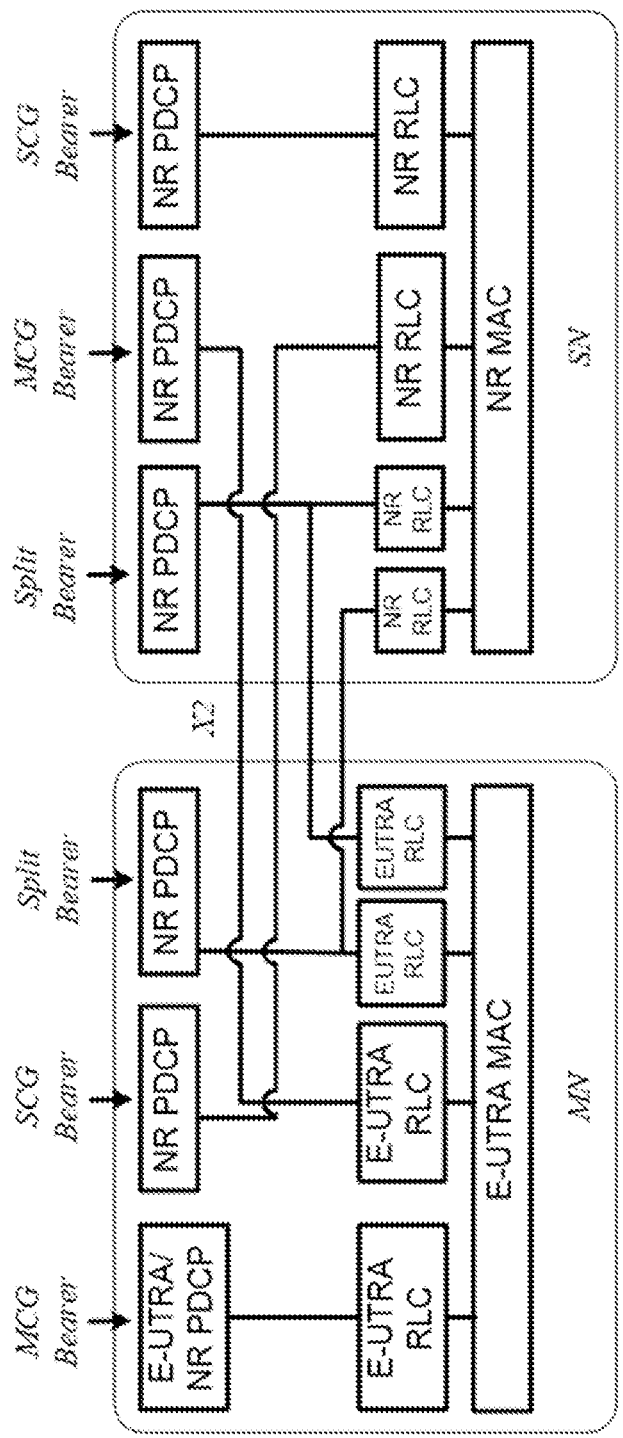
FIG. 3 illustrates network side protocol termination options for MCG, SCG and split bearers in MR-DC with EPC (EN-DC)
Figure 4:
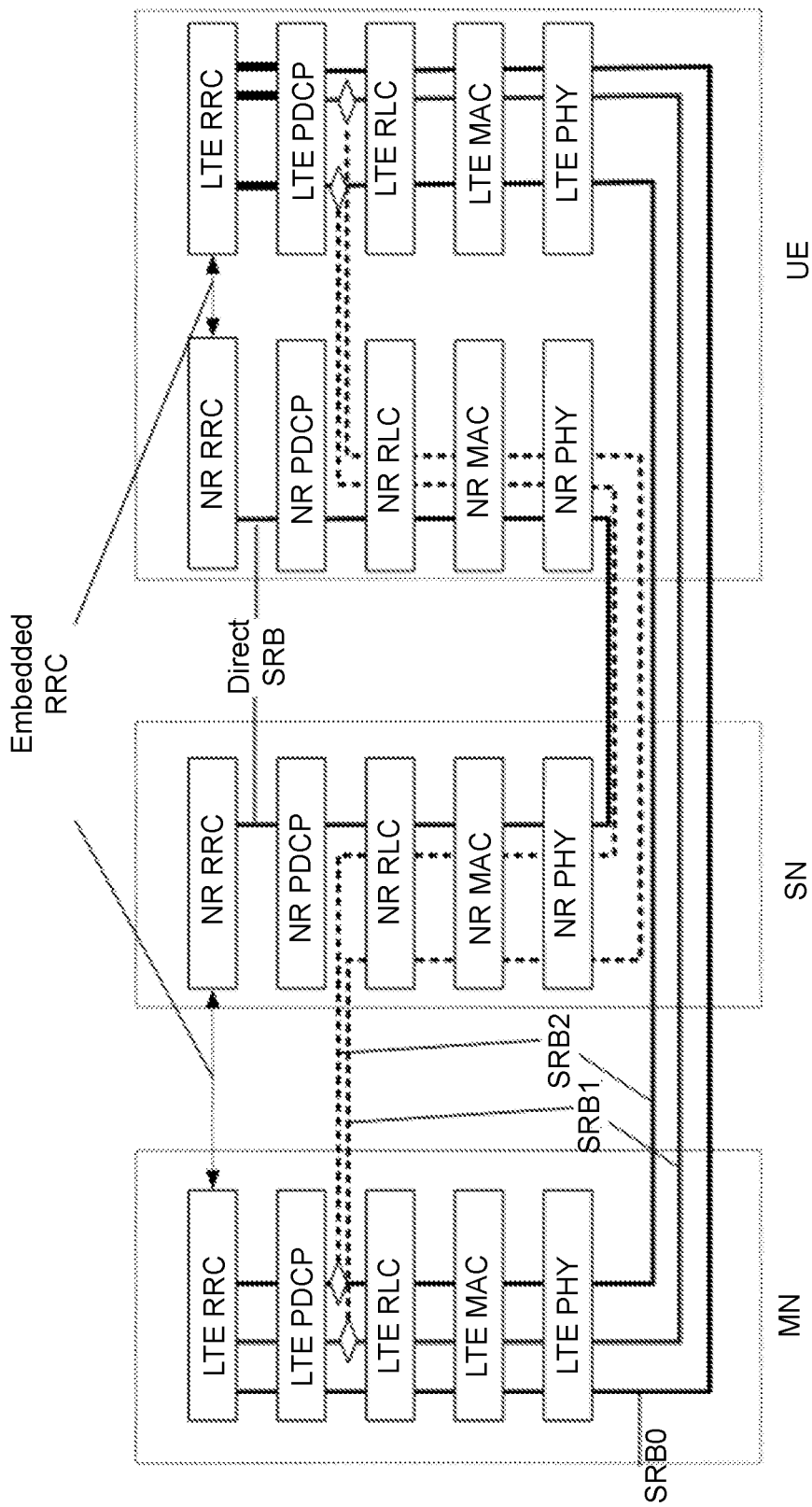
FIG. 4 illustrates a network architecture for control plane in EN-DC.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. MSC, MME, etc.), O&M, OSS, Self Optimizing Network (SON), positioning node (e.g. Evolved-Serving Mobile Location Centre (E-SMLC)), Minimization of Drive Tests (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel And in the following the transmitter or receiver could be either gNB, or UE.

Although the solutions described in this invention are shown with examples using NR, the solutions can be applied to other RATs, e.g. E-UTRA, by using corresponding messages and procedures.

According to certain embodiments, a method is provided to address the case where the UE needs to request System Information Block(s) (SIB(s)), in an on-demand way, that is not scheduled in SIB1 such as, for example, those SIBs whose broadcast status is set to notBroadcasting or the network has decided to only deliver using dedicated delivery or for the case when UE does not have common bandwidth part configured. According to certain embodiments disclosed herein, the UE may be allowed to send the request over the SRB3 via the secondary cell group (SCG). The SCG then can forward the request to the master cell group (MCG) that can take the necessary actions (i.e., sending the requested SIB(s) to the UE).

In case of dual connectivity, such as Multi-Radio Dual Connectivity (MR-DC), SRB3 may be configured for the transfer of some New Radio (NR)/Long Term Evolution (LTE) Radio Resource Control (RRC) messages between UE and Secondary gNodeB (SgNB) via the NR radio interface. The methods and techniques disclosed herein aim to take advantage of this SRB3 in terms of on demand connected mode request and delivery. However, though certain embodiments are disclosed as being applicable to a dual connectivity scenario, it is recognized that the methods and techniques are also applicable for a non-dual connectivity scenario where the nodes are not operating as master and secondary nodes.

Certain embodiments may also provide seamless on demand connected mode functionality when UE is handover to another cell. If there is discontinuity in data reception because of handover procedure taking precedence, the source base station may inform to target base station about the ongoing on demand procedure. If target base stations support the on-demand procedure, the on demand would continue without further delay or having the UE to make a new request from UE.

According to certain embodiments, a wireless device such as a UE, when requesting on-demand SIB(s), may send the information via the SRB3. In a particular embodiment, if both the SRB1 and SRB3 are configured, the wireless device may prioritize the sending of the on-demand SIB(s) message via the SRB3. In another particular embodiment, if both the SRB1 and SRB3 are configured, the wireless device may prioritize the sending of the on-demand SIB(s) message via the SRB1.

According to certain embodiments, the network, such as a network node, may decide if the UE shall use one of the options (SRB3 or SRB1). According to this, if both are configured, the UE may need to be instructed of this choice. In a particular embodiment, this could be done by introducing a new parameter in e.g. RRCReconfiguration or CellGroupConfig indicating the priority of the paths. In another embodiment, this could be done by specifying the prioritization in standardization (fixed behavior written in the specification). Further, a default prioritization can be specified whereby SRB1 has higher priority than SRB3. The network, such as a network node, may decide that on demand request/delivery is not that critical and decide that it can be obtained by using lower priority SRB. In an example, the lower priority SRB may include SRB3.

According to certain embodiments, the network, such as a network node, may categorize the various SIBs in critical and non-critical basis and decide that for critical SIB content, the UE shall use higher priority SRB and for lower priority it shall use lower priority SRB. The example of critical and not-critical categorization based upon how much important the content would be for the UE to operate in the cell or in case of positioning how much important the correction information content is.

In yet another particular embodiment, the choice on which SRB the on-demand SIB(s) request should be send may be left to the UE implementation.

In a particular embodiment, if UE makes a request via SRB1, the network may provide the dedicated delivery via SRB3 or the vice versa is also possible.

In a particular embodiment, upon receiving the on-demand SIB(s) request via SRB3, the secondary node (SN) may forward the message to the mast node (MN) via inter-node Radio Resource Control (RRC) message. In another embodiment, upon receiving the on-demand SIB(s) request via SRB3, the SN may forward the message to the MN via X2AP or XnAP message.

In a particular embodiment, the message received by the SN may be an SN RRC message that has an embedded MN RRC message (i.e. the original on-demand SIB(s) request) in a separate container. Yet, in another particular embodiment, if the MN and SN are employing the same RRC (i.e. the same RAT), then the UE may sends directly on-demand SIB(s) request in the SN's RRC without a need to embed it within a container.

Upon receiving the on-demand SIB(s) request by the SN, in one particular embodiment the MN may generate (some of) the requested SIB(s) and sends them directly via SRB1 to the UE. In another embodiment, upon receiving the on-demand SIB(s) request by the SN, the MN may generate (some of) the requested SIB(s) and send them via inter-node RRC message back to the SN. Yet, in another particular embodiment, upon receiving the on-demand SIB(s) request by the SN, the MN may generate (some of) the requested SIB(s) and send them via X2AP or XnAP message back to the SN. Once the SN receive the SIB(s) from the MN, the SN may forward them to the UE directly via the SRB3.

In a particular embodiment, upon receiving the on-demand SIB(s) request by the SN, the MN may send back an indication on which SIB(s) should be generated to the SN via inter-node RRC or X2AP or XnAP message. In another particular embodiment, the SN may generate the SIB(s) and send them directly to the UE via the SRB3.

In a particular embodiment, upon receiving the on-demand SIB(s) request via SRB3, the SN may generate (some of) the requested SIB(s) and send them directly via SRB3 to the UE. In another particular embodiment, upon sending the requested SIB(s) via the SRB3, the SN may inform the MN about which SIB(s) have been sent to the UE.

Figure 5:
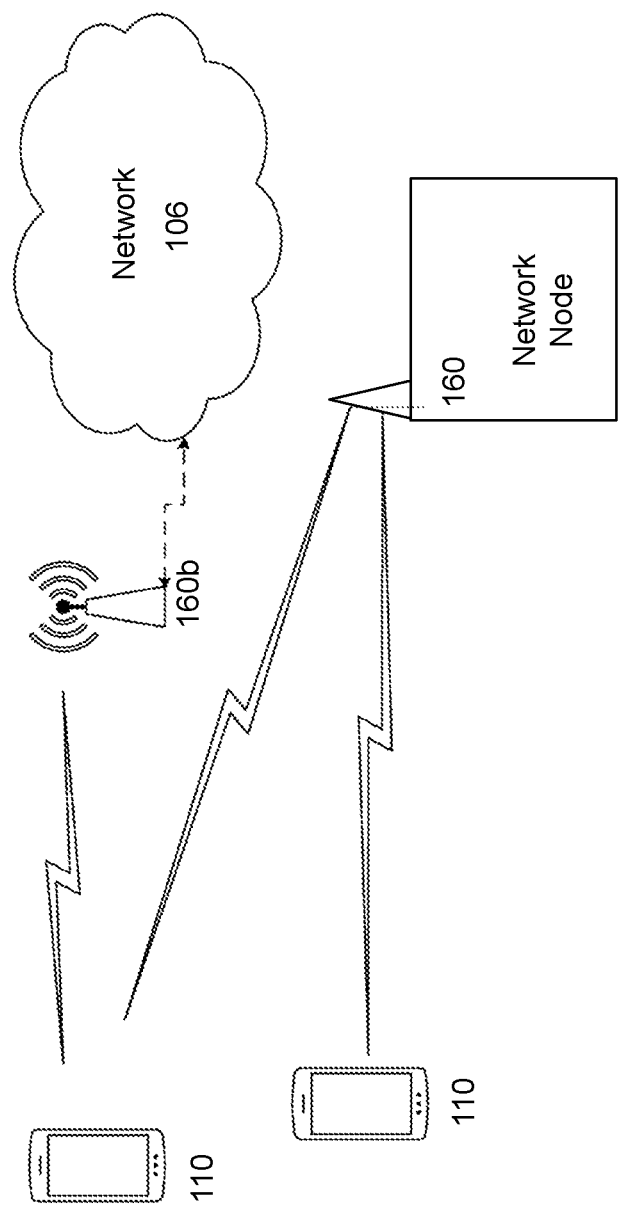
FIG. 5 illustrates an example wireless network, according to certain embodiments.

FIG. 5 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 6:
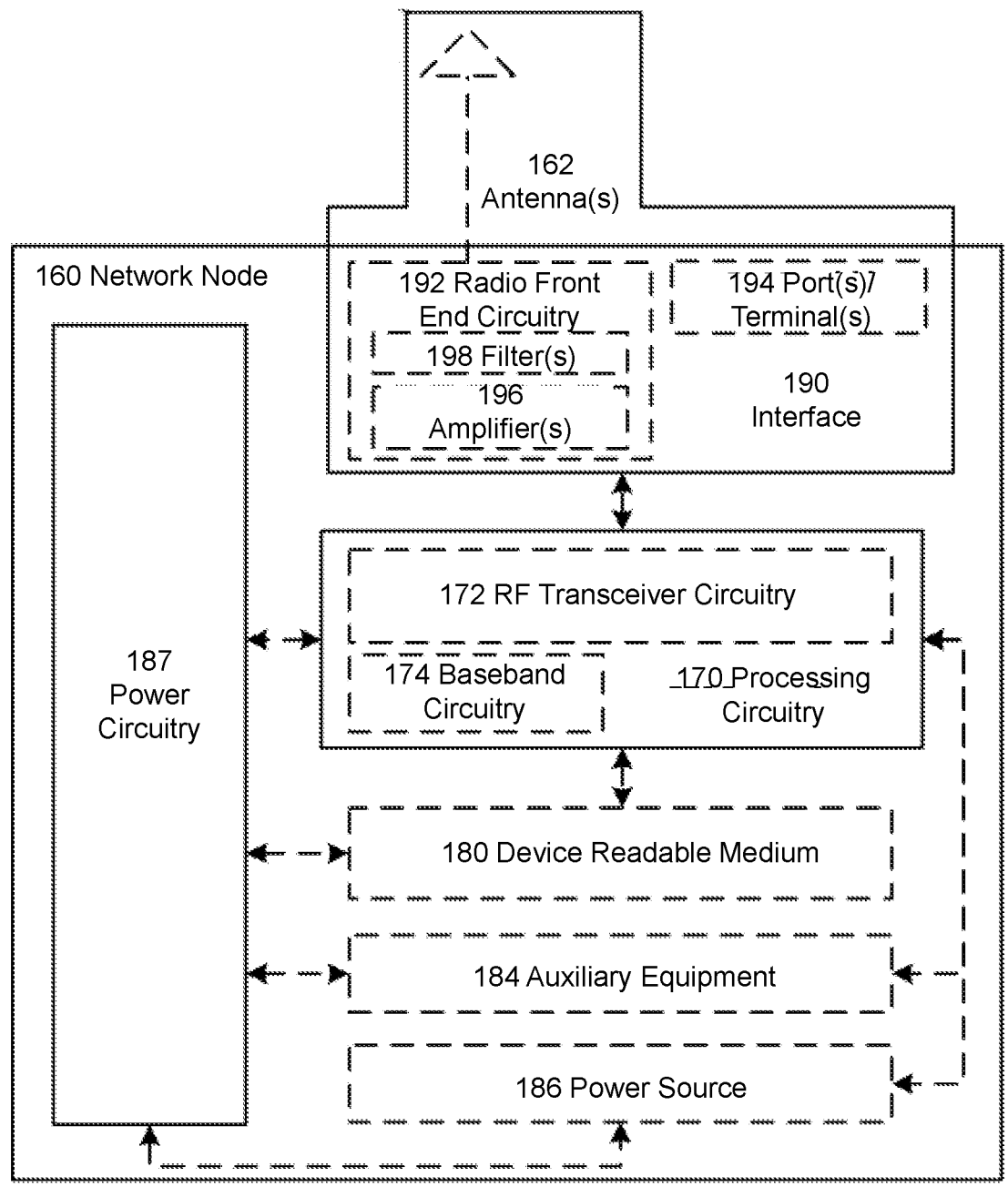
FIG. 6 illustrates an example network node, according to certain embodiments.

FIG. 6 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entities (MMEs)), Operation & Maintenance (O&M) nodes, Operations Support System (OSS) nodes, Self Optimizing Network (SON) nodes, positioning nodes (e.g., Evolved-Serving Mobile Location Centers (E-SMLCs)), and/or Minimization of Drive Tests (MDTs). As another example, a network node may be a virtual network nPRSode as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, Global System for Mobile Communication (GSM), Wide Code Division Multiplexing Access (WCDMA), Long Term Evolution (LTE), New Radio (NR), WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 7:
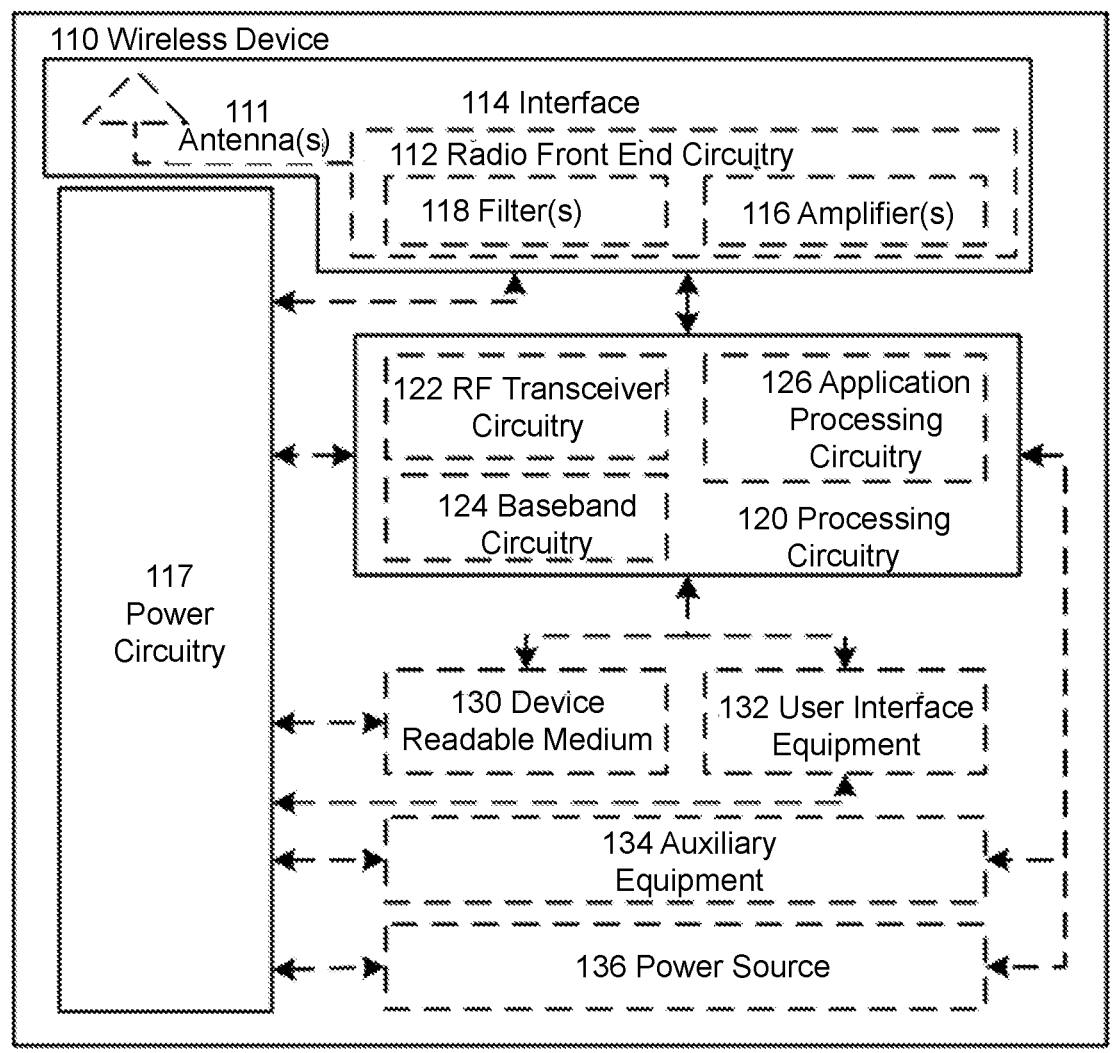
FIG. 7 illustrates an example wireless device, according to certain embodiments.

FIG. 7 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111.

Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 8:
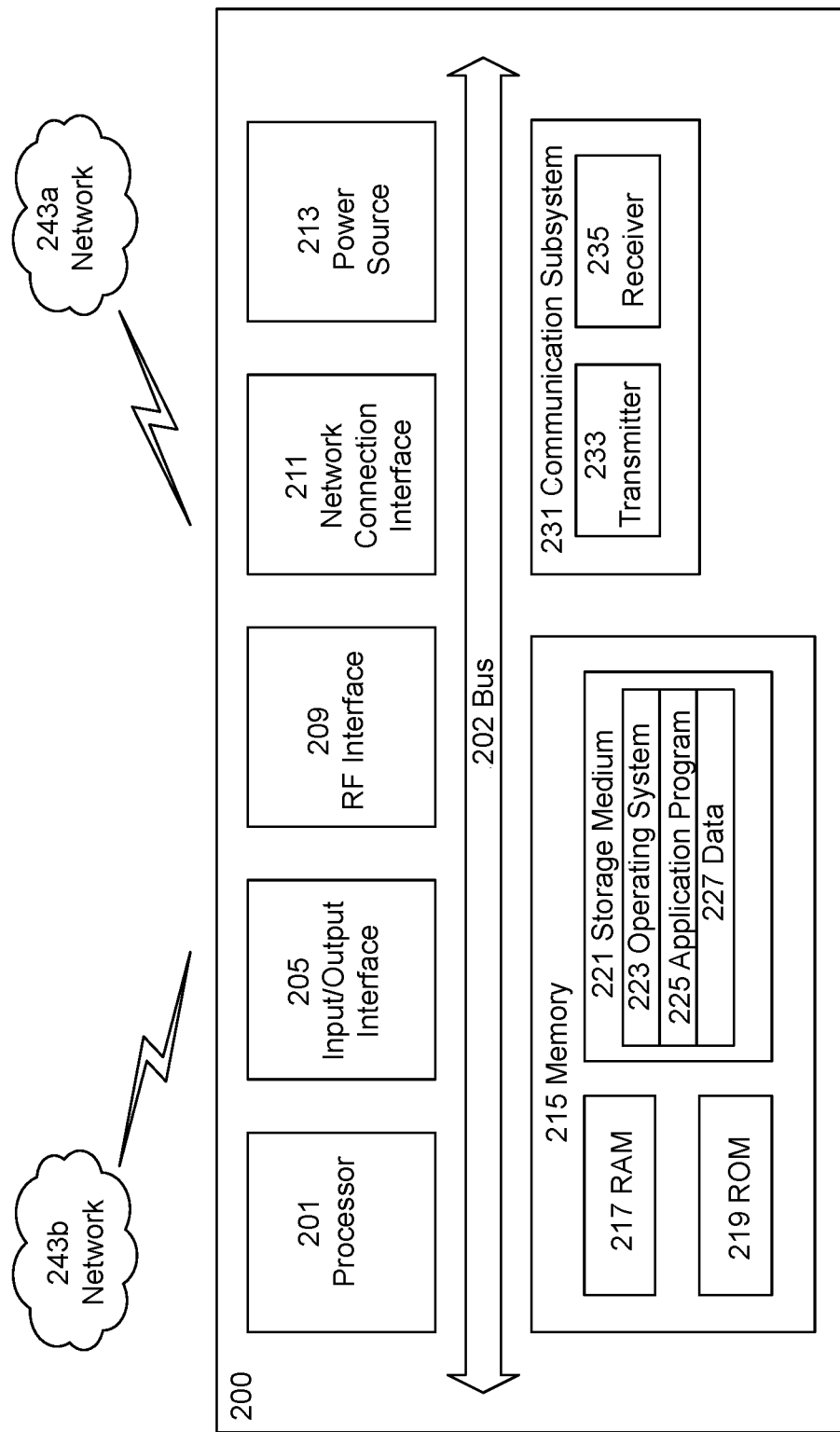
FIG. 8 illustrate an example user equipment, according to certain embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 6, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 8 is a UE, the components discussed herein are equally applicable to a wireless device, and vice-versa.

In FIG. 8, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 8, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 9:
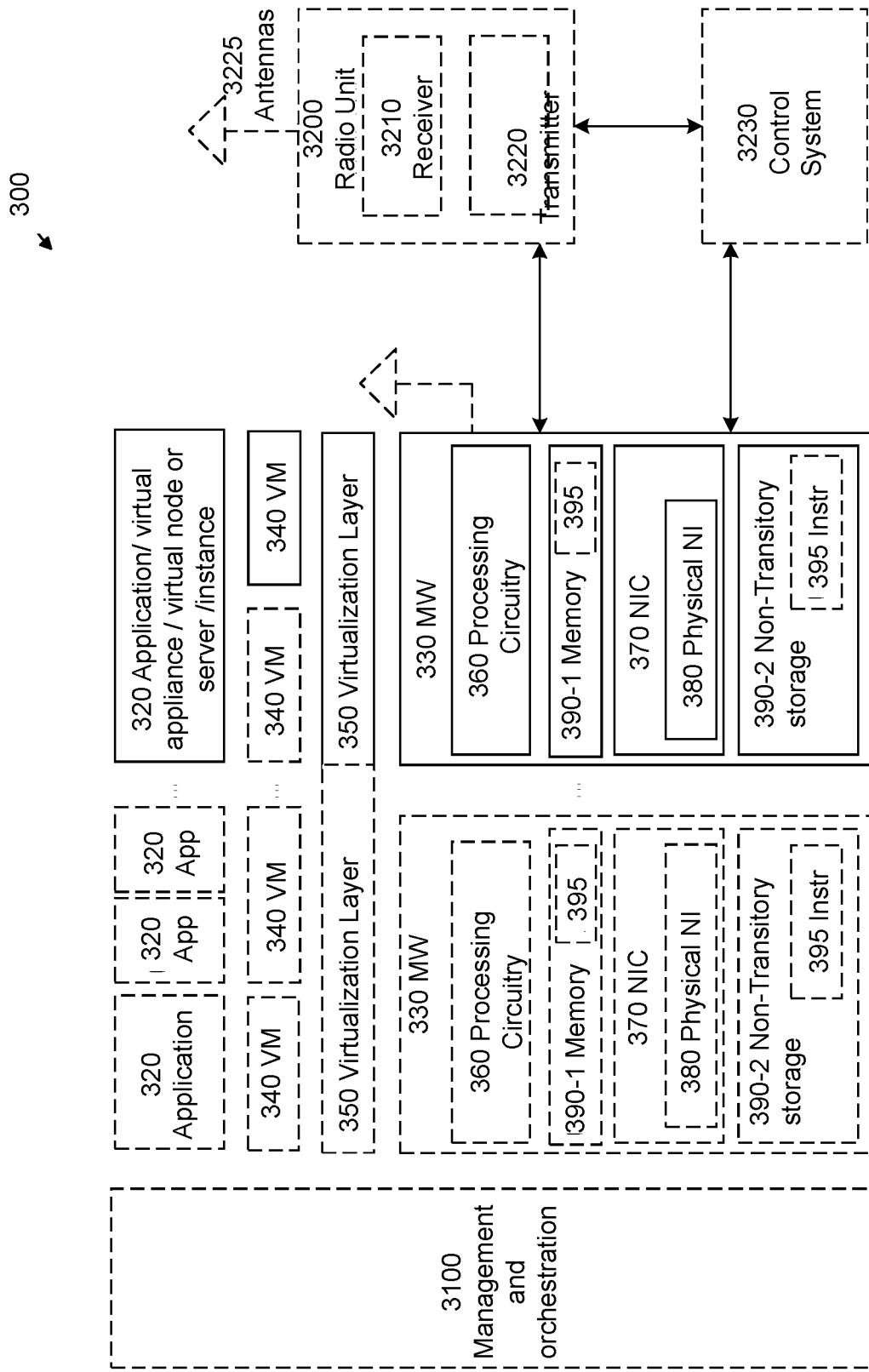
FIG. 9 illustrates a virtualization environment in which functions implemented by some embodiments may be virtualized, according to certain embodiments.

FIG. 9 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 9.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 10:
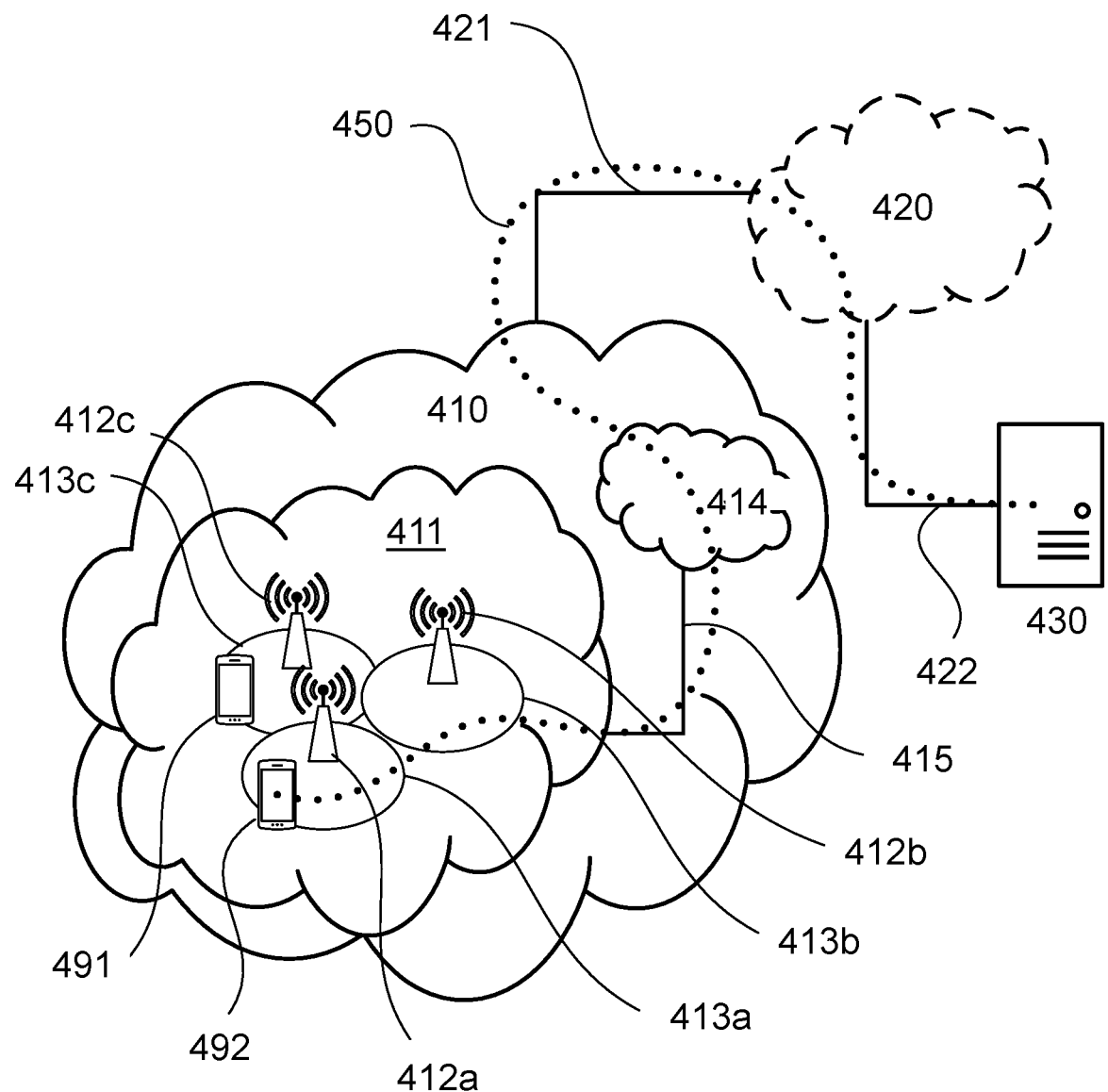
FIG. 10 illustrates a telecommunication network connected via an intermediate network to a host computer, according to certain embodiments.

FIG. 10 illustrates a telecommunication network connected via an intermediate network to a host computer in accordance with some embodiments.

With reference to FIG. 10, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 11:
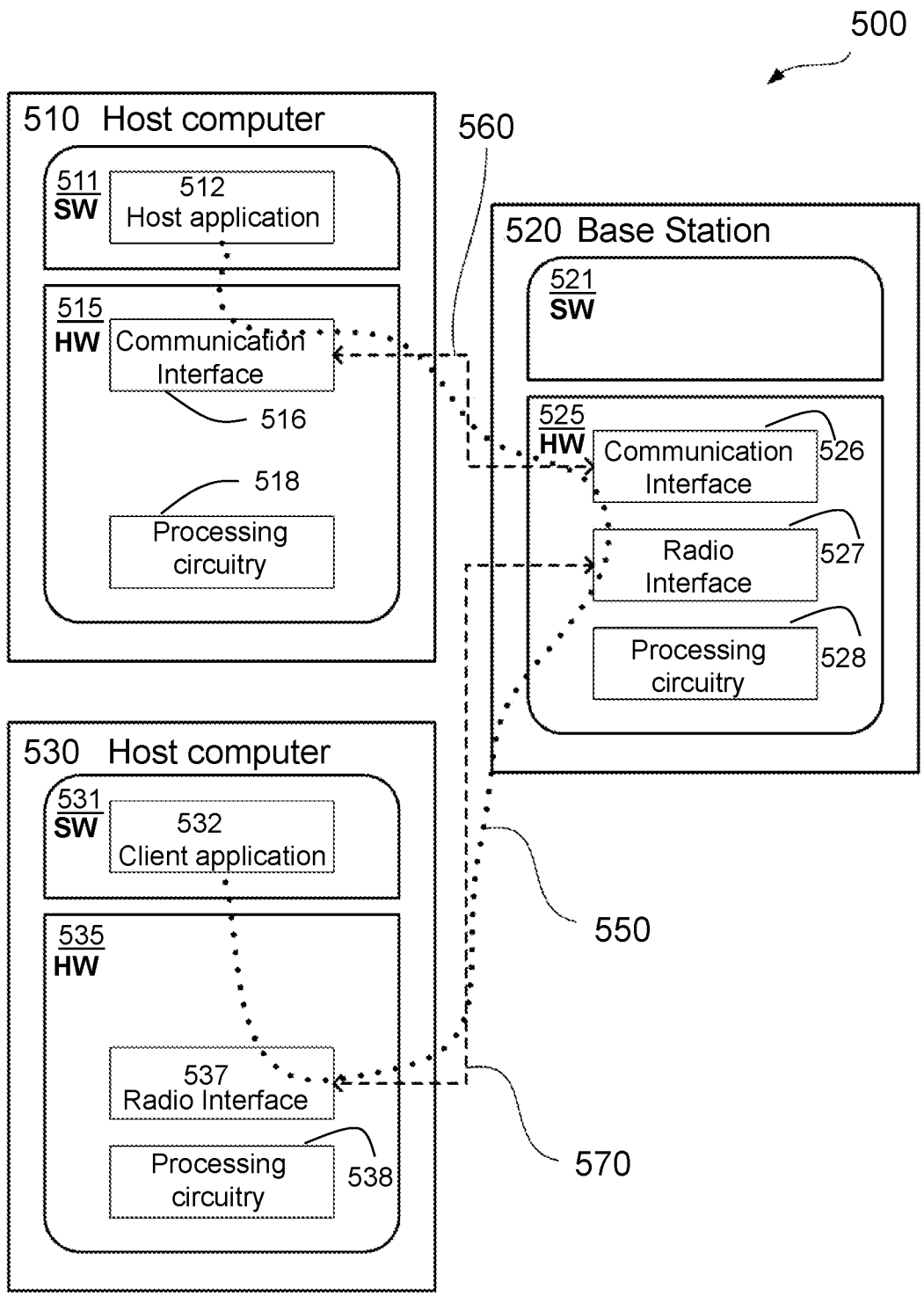
FIG. 11 illustrates a generalized block diagram of a host computer communicating via a base station with a user equipment over a partially wireless connection, according to certain embodiments.

FIG. 11 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by base station 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 11 may be similar or identical to host computer 430, one of base stations 412a, 412b, 412c and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 12, 13:
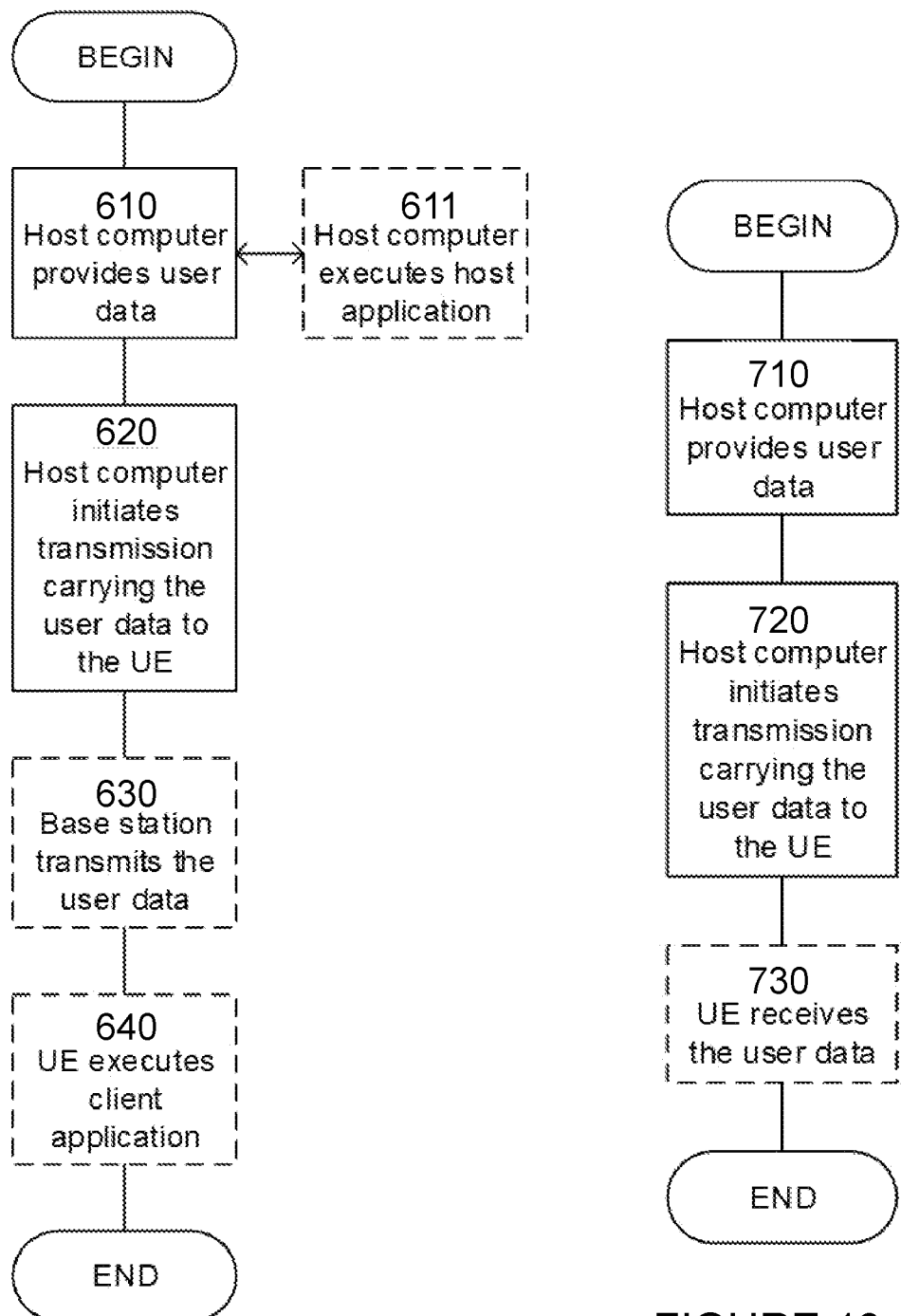
FIG. 12 illustrates a method implemented in a communication system, according to one embodiment.
FIG. 13 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 14:
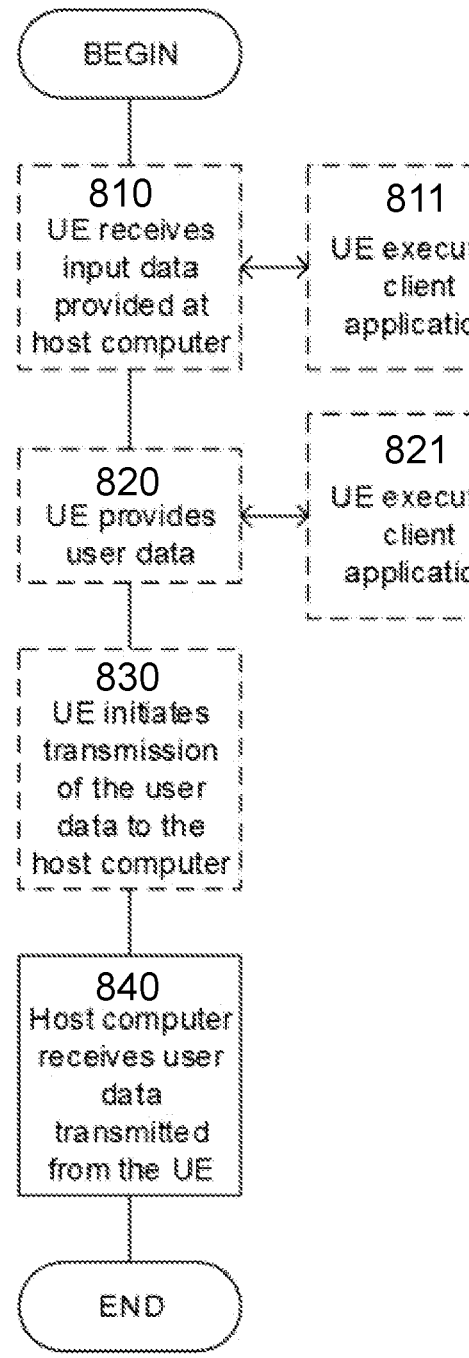
FIG. 14 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 15:
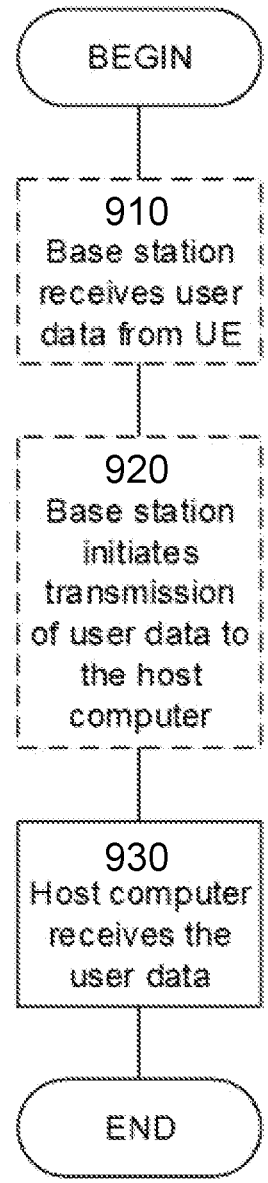
FIG. 15 illustrates another method implemented in a communication system, according to one embodiment.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 16:
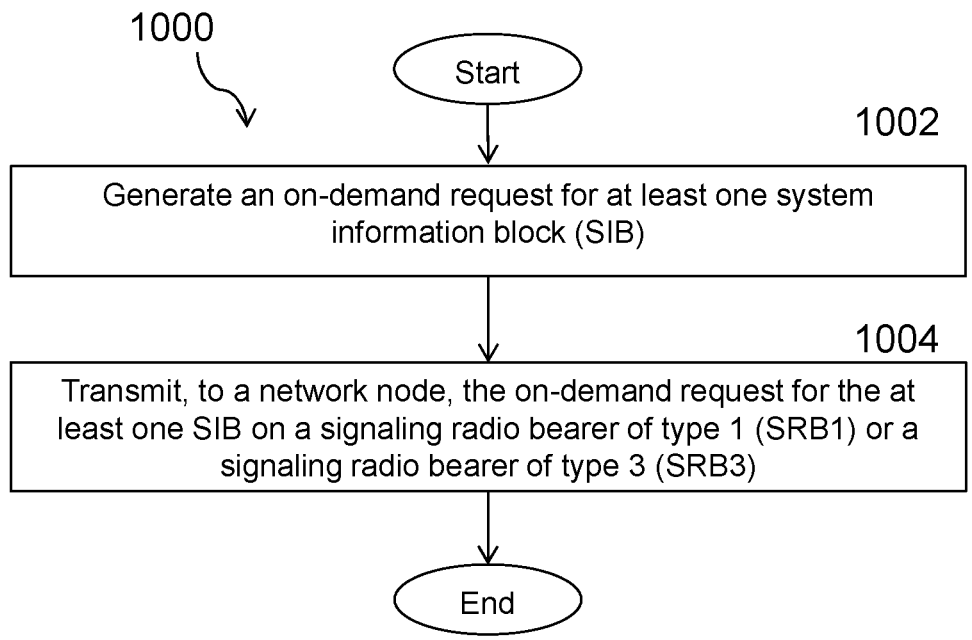
FIG. 16 illustrates an example method by a wireless device, according to certain embodiments.

FIG. 16 depicts a method 1000 by a wireless device 110, according to certain embodiments. At step 1002, the wireless device 110 generates an on-demand request for at least one SIB. At step 1004, the wireless device 110 transmits, to a network node 160, the on-demand request for the at least one SIB on a signaling radio bearer of type 1 (SRB1) or a signaling radio bearer of type 3 (SRB3).

In a particular embodiment, the on-demand request for the at least one SIB is transmitted on the SRB3. In a further particular embodiment, the wireless device is configured for both SRB1 and SRB3, and the wireless device prioritizes the SRB3 over the SRB1 when transmitting the on-demand request on the SRB3. In a further particular embodiment, the wireless device 110 receives, from the network node 160, an indication that the on-demand request for the at least one SIB is to be transmitted on the SRB3. In a further particular embodiment, the indication is received as a radio resource control message.

In a particular embodiment, the on-demand request for the at least one SIB is transmitted on the SRB1. In a further particular embodiment, the wireless device is configured for both SRB1 and SRB3, and the method further comprises prioritizing the SRB1 over the SRB3 when transmitting the on-demand request on the SRB1. In a further particular embodiment, the wireless device 110 receives, from the network node 160, an indication that the on-demand request for the at least one SIB is to be transmitted on the SRB1. In a further particular embodiment, the indication is received as a radio resource control message.

In a particular embodiment, the wireless device 110 is configured for SRB1 and SRB3 and the wireless device 110 selects one of the SRB1 or the SRB3 over the other and transmitting the on-demand request on the selected one of the SRB1 or the SRB3. In a further particular embodiment, the wireless device 110 is configured with a default setting to prioritize one of the SRB1 or the SRB3 over the other. In a further particular embodiment, the wireless device 110 is configured with the default setting to prioritize the SRB1 over SRB3. In a further particular embodiment, the wireless device 110 is configured with the default setting to prioritize the SRB3 over the SRB1. In a further particular embodiment, the wireless device 110 receives, from the network node 160, an indication that the at least one of the SRB1 or the SRB3 are to be used in lieu of the default setting. In a further particular embodiment, the wireless device 110 receives, from the network node 160, an indication identifying one of the SRB1 or the SRB3 that is to be prioritized over the other.

In a particular embodiment, the method further includes categorizing the on-demand request for the SIB as critical or non-critical and selecting the at least one of the SRB1 or the SRB3 based on the on-demand request being categorized as critical or non-critical.

In a particular embodiment, the on-demand request is transmitted on the SRB1 and the wireless device 110 receives the SIB from the network node 160 on the SRB3.

In a particular embodiment, the on-demand request is transmitted on the SRB3 and the wireless device 110 receives the SIB from the network node 160 on the SRB1.

In a particular embodiment, the network node 160 is a secondary network node. In a further particular embodiment, the on-demand request is transmitted in a secondary network node radio resource control message. In a further particular embodiment, the on-demand request is for a master network node and the on-demand request is in a master network node radio resource control message that is embedded in a secondary network node radio resource control message. In a further particular embodiment, the wireless device receives the SIB from the secondary network node. In a further particular embodiment, the wireless device receives the SIB from the master network node.

Figure 17:
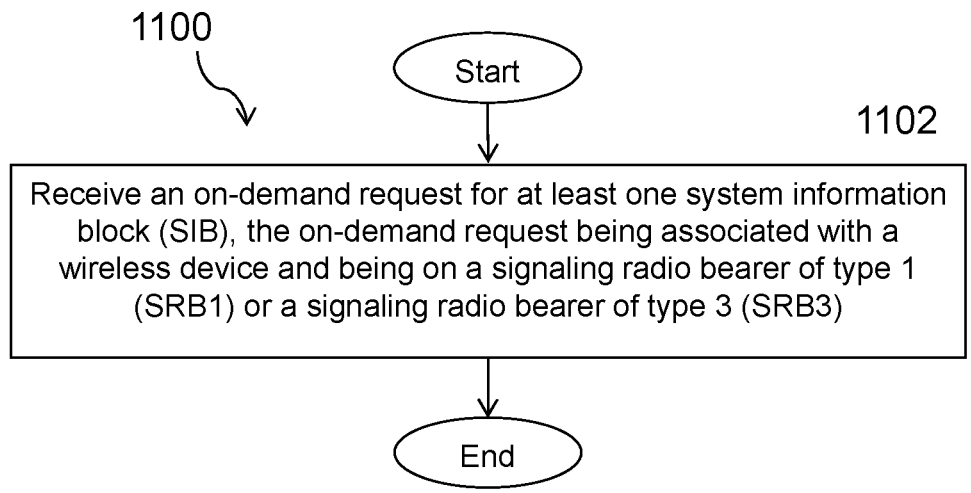
FIG. 17 illustrates an example method by a network node, according to certain embodiments.

FIG. 17 depicts a method 1100 by a network node 160, according to certain embodiments. At step 1102, the network node 160 receives an on-demand request for at least one system information block (SIB), the on-demand request being associated with a wireless device and being received on a signaling radio bearer of type 1 (SRB1) or a signaling radio bearer of type 3 (SRB3).

In a particular embodiment, the on-demand request for the at least one SIB is received on the SRB3. In a further particular embodiment, the wireless device 110 is configured for both SRB1 and SRB3, and the network node 160 or another network node configures the wireless device 110 to prioritize the SRB3 over the SRB1 when transmitting the on-demand request on the SRB3. In a further particular embodiment, the network node 160 transmits, to the wireless device 110, an indication that the on-demand request for the at least one SIB is to be transmitted on the SRB3. In a further particular embodiment, the indication is transmitted as a radio resource control message.

In a particular embodiment, the on-demand request for the at least one SIB is received on the SRB1. In a further particular embodiment, the wireless device 110 is configured for both SRB1 and SRB3, and the network node 160 or another network node the wireless device 110 to prioritize the SRB1 over the SRB3 when transmitting the on-demand request on the SRB1. In a further particular embodiment, the network node 160 transmits, to the wireless device 110, an indication that the on-demand request for the at least one SIB is to be transmitted on the SRB1. In a further particular embodiment, the indication is transmitted as a radio resource control message.

In a particular embodiment, the wireless device 110 is configured for SRB1 and SRB3 and the network node 160 or another network node configures the wireless device 110 to select one of the SRB1 or the SRB3 over the other and transmit the on-demand request on the selected one of the SRB1 or the SRB3. In a further particular embodiment, the wireless device 110 is configured with a default setting to prioritize one of the SRB1 or the SRB3 over the other. In a further particular embodiment, the wireless device 110 is configured with the default setting to prioritize the SRB1 over SRB3. In a further particular embodiment, the wireless device 110 is configured with the default setting to prioritize the SRB3 over the SRB1. In a further particular embodiment, the network node 160 transmits, to the wireless device 110, an indication that the at least one of the SRB1 or the SRB3 are to be used in lieu of the default setting. In a further particular embodiment, the network node 160 transmits, to the wireless device 110, an indication identifying one of the SRB1 or the SRB3 that is to be prioritized over the other.

In a particular embodiment, the network node 160 configures the wireless device 110 to categorize the on-demand request for the SIB as critical or non-critical and select the at least one of the SRB1 or the SRB3 based on the on-demand request being categorized as critical or non-critical.

In a particular embodiment, the on-demand request is received on the SRB1 and the network node 160 transmits the SIB from the network node on the SRB3.

In a particular embodiment, the on-demand request is received on the SRB3 and the network node 160 transmits the SIB from the network node on the SRB1.

In a particular embodiment, the network node 160 is operating as a secondary network node with respect to the wireless device 110. In a further particular embodiment, the network node 160 forwards the on-demand request to a master network node. In a further particular embodiment, the on-demand request is forwarded to the master network node via a radio resource control message. In a further particular embodiment, the on-demand request is forwarded to the master network node via a X2AP or XnAP message. In a further particular embodiment, the on-demand request is received in a secondary network node radio resource control message. In a further particular embodiment, the on-demand request is in a master network node radio resource control message that is embedded in a secondary network node radio resource control message. In a further particular embodiment, the network node 160 receives the at least one SIB from the master network node and forwarding the at least one SIB to the wireless device 110. In a further particular embodiment, the network node 160 performs at least one of: generating the at least one SIB in response to the on-demand request, transmitting the at least one SIB to the wireless device 110, and transmitting an indication to a master network node indicating the at least one SIB that has been generated.

In a particular embodiment, the network node 160 is operating as a master network node with respect to the wireless device 110 and the on-demand request is received from another network node operating as a secondary network node with respect to the wireless device 110. In a further particular embodiment, the on-demand request is received via a radio resource control message. In a further particular embodiment, the on-demand request is received via a X2AP or XnAP message. In a further particular embodiment, the on-demand request is in a master network node radio resource control message that is embedded in a secondary network node radio resource control message. In a further particular embodiment, in response to receiving the on-demand request for the at least one SIB, the network node 160 generates the at least one SIB and transmitting the at least one SIB to the wireless device 110. In a further particular embodiment, the network node 160 transmits the at least one SIB via SRB1. In a further particular embodiment, in response to receiving the on-demand request for the at least one SIB, the network node 160 generates the at least one SIB and transmitting the at least one SIB to the other network node operating as the secondary network node with respect to the wireless device 110. In a further particular embodiment, the at least one SIB is transmitted to the other network node via X2AP or XnAP message. In a further particular embodiment, the at least one SIB is transmitted to the other network node 160 as a radio resource control message. In a further particular embodiment, the network node 160 transmits to the network node operating as the secondary network node an indication of the at last one SIB that is to be generated in response to the on-demand request.

Figure 18:
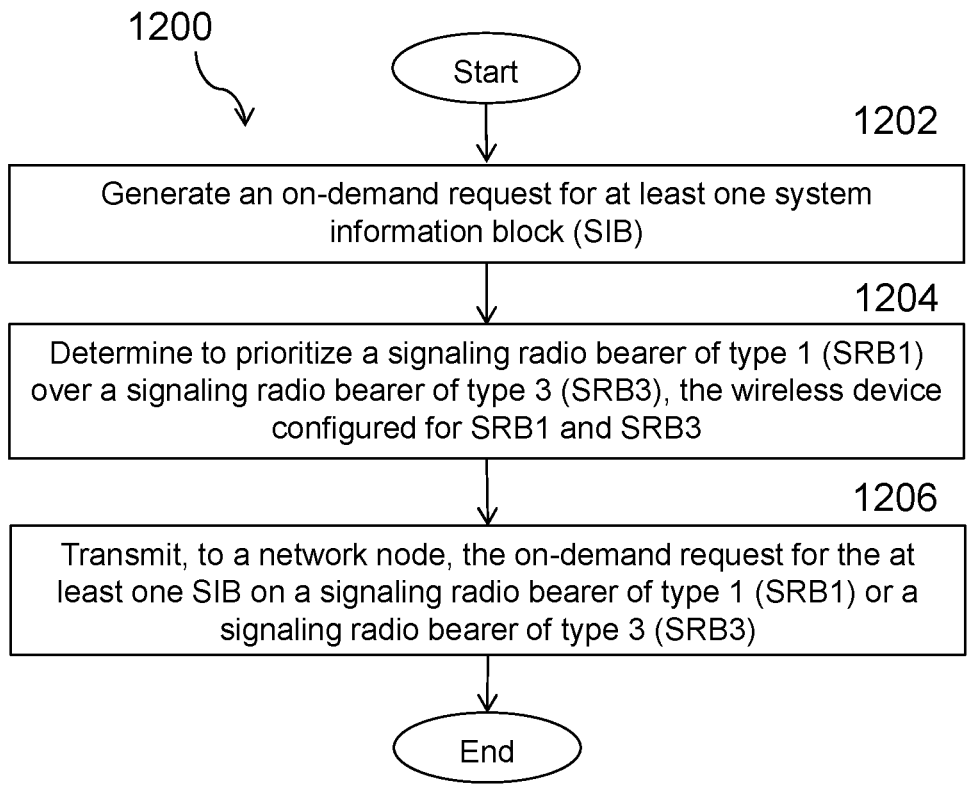
FIG. 18 illustrates another example method by a wireless device, according to certain embodiments.

FIG. 18 depicts another method 1200 by a wireless device 110, according to certain embodiments. According to certain embodiments, the wireless device is configured for SRB1 and SRB3. At step 1202, the wireless device 110 generates an on-demand request for at least one SIB. At step 1204, the wireless device 110 determines to prioritize SRB1 over SRB3. At step 1206, the wireless device 110 transmits, to a network node 160, the on-demand request for the at least one SIB on the SRB3 that is prioritized over the SRB1.

In a particular embodiment, the wireless device 110 receives, from the network node 160, an indication that the on-demand request for the at least one SIB is to be transmitted on the SRB3.

In a particular embodiment, the indication is received as a radio resource control message.

In a particular embodiment, the wireless device 110 is configured with a default setting to prioritize the SRB3 over the SRB1.

In a particular embodiment, the wireless device 110 receives, from the network node 160, an indication that the SRB3 is to be prioritized over the SRB1 in lieu of a default setting to use the SRB1.

In a particular embodiment, the wireless device 110 receives, from the network node 160, an indication identifying that the SRB3 is to be prioritized over the SRB1.

In a particular embodiment, the wireless device 110 categorizes the on-demand request for the SIB as critical or non-critical. Prioritizing the SRB3 over the SRB1 includes selecting the SRB3 based on the on-demand request being categorized as critical or non-critical.

In a particular embodiment, the wireless device 110 determines that the SRB1 is congested or not available, and the SRB3 is prioritized over the SRB1 in response to determining that the SRB1 is congested or not available. For example, the wireless device 110 may determine that an amount of traffic on SRB1 is greater than a threshold and prioritize SRB3 over SRB1 based on this determination.

In a particular embodiment, the wireless device 110 receives the SIB from the network node 160 on the SRB1.

In a particular embodiment, the network node is a secondary network node, and the on-demand request is transmitted in a secondary network node radio resource control message. In a further particular embodiment, the on-demand request is for a master network node and the on-demand request is in a master network node radio resource control message that is embedded in the secondary network node radio resource control message.

In a particular embodiment, the wireless device is in dual connectivity. In a further particular embodiment, the network node 160 is a secondary network node, and the wireless device is in handover from a master cell group, MCG, associated with a master network node to a secondary cell group, SCG, associated with the secondary network node. In a further particular embodiment, the network node 160 receives at least one SIB from the master network node.

In a particular embodiment, the network node 160 receives at least one SIB from the secondary network node.

In a particular embodiment, the on-demand request for the at least one SIB is transmitted in a Radio Resource Control message.

Figure 19:
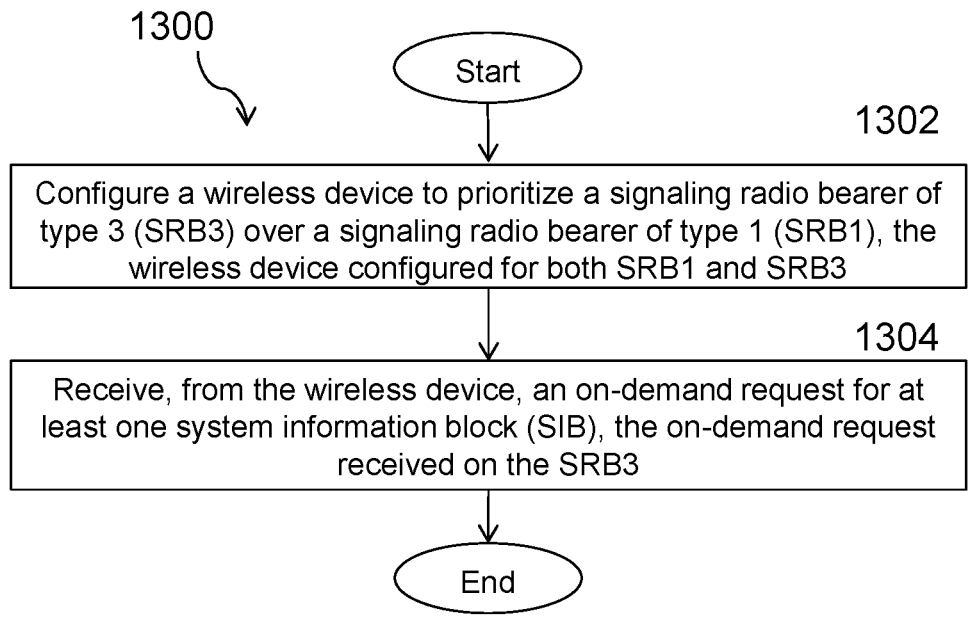
FIG. 19 illustrates another example method by a network node, according to certain embodiments.

FIG. 19 depicts another method 1300 by a network node 160, according to certain embodiments. At step 1302, the network node 160 configures a wireless device, which is configured for both SRB1 and SRB3, to prioritize RB3) over SRB1. At step 1304, the network node 160 receives, from the wireless device 110 and on the SRB3, an on-demand request for at least one SIB.

In a particular embodiment, the network node 160 transmits, to the wireless device 110, an indication that the on-demand request for the at least one SIB is to be transmitted on the SRB3. In a further particular embodiment, the indication is transmitted as a radio resource control message.

In a particular embodiment, the wireless device is configured with a default setting to prioritize the SRB3 over the SRB1.

In a particular embodiment, the network node 160 transmits, to the wireless device 110, an indication that the SRB3 is to be used in lieu of a default setting to use the SRB1.

In a particular embodiment, the network node 160 additionally configures the wireless device 110 to categorize the on-demand request for the SIB as critical or non-critical. The wireless device is configured to select the SRB3 based on the on-demand request being categorized as critical or non-critical.

In a particular embodiment, the network node 160 configures the wireless device 110 to determine whether the SRB1 is congested or not available and prioritize the SRB3 over the SRB1 when the SRB1 is congested or not available. For example, the wireless device 110 may be configured to determine that an amount of traffic on SRB1 is greater than a threshold and prioritize SRB3 over SRB1 based on the determination.

In a particular embodiment, the network node 160 transmits the SIB on the SRB1.

In a particular embodiment, the network node 160 is operating as a secondary network node with respect to the wireless device 110, and the network node 160 forwards the on-demand request to a master network node. In a further particular embodiment, the on-demand request is forwarded to the master network node via a radio resource control message, a X2AP message, or a XnAP message.

In a particular embodiment, the on-demand request is received in a secondary network node radio resource control message.

In a particular embodiment, the on-demand request is in a master network node radio resource control message that is embedded in a secondary network node radio resource control message.

In a particular embodiment, the network node 160 receives the at least one SIB from the master network node and forwards the at least one SIB to the wireless device 110.

In a particular embodiment, the network node 160 performs at least one of: generating the at least one SIB in response to the on-demand request, transmitting the at least one SIB to the wireless device, and transmitting an indication to a master network node indicating the at least one SIB that has been generated.

In a particular embodiment, the network node 160 is operating as a master network node with respect to the wireless device 110, and the on-demand request is received from another network node operating as a secondary network node with respect to the wireless device 110. In a further particular embodiment, the on-demand request is received via a radio resource control message, a X2AP message, or a XnAP message. In a further particular embodiment, the on-demand request is in a master network node radio resource control message that is embedded in a secondary network node radio resource control message.

In a particular embodiment, in response to receiving the on-demand request for the at least one SIB, the network node 160 generates the at least one SIB and transmits the at least one SIB to the wireless device 110. In a further particular embodiment, the network node 160 transmits the at least one SIB via SRB1.

In a particular embodiment, in response to receiving the on-demand request for the at least one SIB, the network node 160 generates the at least one SIB and transmits the at least one SIB to the other network node operating as the secondary network node with respect to the wireless device 110. In a further particular embodiment, the at least one SIB is transmitted to the other network node via a X2AP message, a XnAP message, or as a radio resource control message.

In a particular embodiment, the wireless device is in dual connectivity. In a further particular embodiment, the network node comprise a secondary network node, and the wireless device is in handover from a MCG associated with a master network node to a SCG associated with the secondary network node. In a particular embodiment, the network node 160 operating as the master network node transmits a message to the other network node operating as the secondary network node, and the message indicating an ongoing on demand connected mode procedure.

In another particular embodiment, the network node transmits, to another network node, a handover message comprising information associated with an ongoing on demand connected mode procedure.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method by a wireless device comprising:
generating an on-demand request for at least one system information block (SIB);
determining to prioritize a signaling radio bearer of type 3 (SRB3) over a signaling radio bearer of type 1 (SRB1), the wireless device being configured for SRB1 and SRB3; and
transmitting, to a network node, the on-demand request for the at least one SIB, wherein the on-demand request for the at least one SIB includes an indication that the SRB3 that is prioritized over the SRB1 should be used for the at least one SIB.

2. The method of claim 1, further comprising receiving, from the network node, an indication that the on-demand request for the at least one SIB is to be transmitted on the SRB3.

3. The method of claim 2, wherein the indication is received as a radio resource control message.

4. The method of claim 1, wherein the wireless device is configured with a default setting to prioritize the SRB3 over the SRB1.

5. The method of claim 1, further comprising receiving, from the network node, an indication that the SRB3 is to be prioritized over the SRB1 in lieu of a default setting to use the SRB1.

6. The method of claim 1, further comprising receiving, from the network node, an indication identifying that the SRB3 is to be prioritized over the SRB1.

7. The method of claim 1, further comprising categorizing the on-demand request for the SIB as critical or non-critical, and wherein prioritizing the SRB3 over the SRB1 comprises selecting the SRB3 based on the on-demand request being categorized as critical or non-critical.

8. The method of claim 1, further comprises determining that the SRB1 is congested or not available, wherein the SRB3 is prioritized over the SRB1 in response to determining that the SRB1 is congested or not available.

9. The method of claim 1, further comprising receiving the SIB from the network node on the SRB1.

10. The method of claim 1, wherein the network node is a secondary network node, and the on-demand request is transmitted in a secondary network node radio resource control message.

11. The method of claim 10, wherein the on-demand request is for a master network node and the on-demand request is in a master network node radio resource control message that is embedded in the secondary network node radio resource control message.

12. The method of claim 1, wherein the wireless device is in dual connectivity.

13. The method of claim 12, wherein:
the network node comprise a secondary network node,
the wireless device is in handover from a master cell group, MCG, associated with a master network node to a secondary cell group, SCG, associated with the secondary network node.

14. The method of claim 13, further comprising receiving at least one SIB from the master network node.

15. The method of claim 13, further comprising receiving at least one SIB from the secondary network node.

16. The method of claim 1, wherein the on-demand request for the at least one SIB is transmitted in a Radio Resource Control message.

17. A method by a network node comprising:
configuring a wireless device to prioritize a signaling radio bearer of type 3 (SRB3) over a signaling radio bearer of type 1 (SRB1), the wireless device configured for both SRB1 and SRB3; and
receiving, from the wireless device, an on-demand request for at least one system information block (SIB), wherein the on-demand request for the at least one SIB includes an indication that the SRB3 that is prioritized over the SRB1 should be used for the at least one SIB.

18. The method of claim 17, further comprising transmitting, to the wireless device, an indication that the on-demand request for the at least one SIB is to be transmitted on the SRB3.

19. A wireless device comprising processing circuitry configured to perform the method of claim 1.

20. A network node comprising processing circuitry configured to perform the method of claim 17.

\* \* \* \* \*